United States Patent
Eick et al.

(10) Patent No.: US 9,239,220 B2
(45) Date of Patent: Jan. 19, 2016

(54) DETERMINATION OF NEAR SURFACE GEOPHYSCIAL PROPERTIES BY IMPULSIVE DISPLACEMENT EVENTS

(71) Applicant: CONOCOPHILLIPS COMPANY, Houston, TX (US)

(72) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 1 day.

(21) Appl. No.: 13/874,037

(22) Filed: Apr. 30, 2013

(65) Prior Publication Data

US 2013/0283923 A1    Oct. 31, 2013

Related U.S. Application Data

(60) Provisional application No. 61/640,296, filed on Apr. 30, 2012.

(51) Int. Cl.

| | |
|---|---|
| *G01N 19/06* | (2006.01) |
| *G01B 5/30* | (2006.01) |
| *G01V 1/145* | (2006.01) |
| *G01V 1/30* | (2006.01) |
| *G01V 1/00* | (2006.01) |
| *G01V 1/047* | (2006.01) |

(52) U.S. Cl.
CPC *G01B 5/30* (2013.01); *G01V 1/006* (2013.01); *G01V 1/145* (2013.01); *G01V 1/306* (2013.01); *G01V 1/005* (2013.01); *G01V 1/047* (2013.01)

(58) Field of Classification Search
None
See application file for complete search history.

(56) References Cited

U.S. PATENT DOCUMENTS

| | | | |
|---|---|---|---|
| 4,621,347 | A | 11/1986 | Ostrander |
| 4,750,157 | A | 6/1988 | Shei |
| 5,253,217 | A | 10/1993 | Justices, Jr. et al. |
| 5,511,040 | A | 4/1996 | Nyland |
| 5,719,821 | A | 2/1998 | Sallas et al. |
| 6,664,788 | B2 | 12/2003 | Hornbostel et al. |
| 6,665,617 | B2 | 12/2003 | Shobayashi |
| 6,982,928 | B2 | 1/2006 | Al-Ali |
| 7,107,159 | B2 | 9/2006 | German |

(Continued)

FOREIGN PATENT DOCUMENTS

EP    1375753    1/2004

OTHER PUBLICATIONS

Robert Ley, et al., Ground viscosity and stiffness measurements for near surface seismic velocity; 2006 Saudi Aramco, Geophysical Prospecting, 54, 751-762.

*Primary Examiner* — Lisa Caputo
*Assistant Examiner* — Brandi N Hopkins
(74) *Attorney, Agent, or Firm* — ConocoPhillips Company

(57) ABSTRACT

The invention is an improved technique for measuring near surface attributes of the ground while conducting a seismic survey. The improved technique is enabled by an electric vibe using a number of linear electric motors that direct a rod or piston to contact the ground in a recurring fashion. By applying constant force on the rods of the linear electric motors against the ground, the penetration into the ground may be measured for both rate and overall deformation. This information provides an accurate indication of viscosity and stiffness. In addition shear velocity and compression velocity may be measured and in some conditions, even the type of prominent shear wave may be identified for the area.

15 Claims, 2 Drawing Sheets

(56) References Cited

U.S. PATENT DOCUMENTS

| | | |
|---|---|---|
| 7,515,505 B2 | 4/2009 | Krohn et al. |
| 7,813,224 B2 * | 10/2010 | Krumhansl et al. .......... 367/189 |
| 2005/0041527 A1 * | 2/2005 | Al-Ali ............................. 367/38 |
| 2005/0100417 A1 | 5/2005 | Bylica |
| 2009/0010103 A1 | 1/2009 | Sallas et al. |
| 2009/0133487 A1 | 5/2009 | Jeffryes |
| 2010/0097888 A1 | 4/2010 | Neelamani et al. |

* cited by examiner

DETERMINATION OF NEAR SURFACE
GEOPHYSCIAL PROPERTIES BY
IMPULSIVE DISPLACEMENT EVENTS

CROSS-REFERENCE TO RELATED
APPLICATIONS

This application is a non-provisional application which claims benefit under 35 USC §119(e) to U.S. Provisional Application Ser. No. 61/640,296 filed Apr. 30, 2012, entitled "DETERMINING NEAR SURFACE GEOPHYSICAL PROPERTIES BY IMPULSIVE DISPLACEMENT EVENTS," which is incorporated herein in its entirety.

STATEMENT REGARDING FEDERALLY
SPONSORED RESEARCH OR DEVELOPMENT

None.

FIELD OF THE INVENTION

This invention relates to vibratory seismic sources and particularly to seismic sources that are held to the ground to deliver vibratory impulses into the earth for seismic prospecting of hydrocarbons and other subsurface resources.

BACKGROUND OF THE INVENTION

In the process of acquiring seismic data, seismic energy is delivered into the earth. Near surface geology tends to significant affect the seismic energy both going down into the earth and also returning back to the surface. Understanding the near surface geophysical parameters for statics, modeling and coupling would aid geophysicists in their understanding of the subsurface geology through the better interpretation of the seismic data. Several efforts have been made to measure the viscosity and stiffness of the near surface, but the results have been less than satisfactory.

Sercel makes a 432 and 464 vibe controllers that use feedback information from a conventional vibe doing a conventional sweep to make an estimate of the viscosity and stiffness of the near surface geology. The inventors of the present invention have recognized that a limitation of this type of system is that a conventional vibe uses a large baseplate that presses to the ground and the feedback to the Sercel 432 and 464 vibe controller includes all the associated problems of a large baseplate. Issues such as distortion, baseplate flexure, hydraulic limitations like cavitations in the hydraulic lines. While this system provides a reasonable first order guess at the parameters for viscosity and stiffness, improvements in this area would be quite welcome.

In an article published in 2006 by Robert Ley, et al. in Geophysical Prospecting, 2006, 54, 751-762, a helpful discussion of having ground viscosity and stiffness measurements help provide near surface seismic velocity. In this article, there is a description of how the viscosity and stiffness were measured, but it was recognized that current measurement techniques varied significantly from vibe to vibe. The article makes a strong case that better measurement techniques for near surface viscosity and stiffness would be very useful for the industry

BRIEF SUMMARY OF THE DISCLOSURE

The invention more particularly relates to a process for measuring near surface properties of the ground for use in seismic prospecting wherein a grid of linear motors are provided to be oriented generally vertically such that each linear electric motor includes a rod that in operation extends down to contact the ground with a lower end of the rod. The rods are extended with a constant force against the ground for a period of time so as to measure the rate of penetration for each rod into the ground and measure the overall deformation of the ground made by each rod. The viscosity and stiffness of the ground is computed based on the rate of penetration and overall deformation measured.

"Generally vertical" or "generally vertically" should be interpreted as meaning "with an axis of movement sufficiently nearly vertical with respect to the ground so as effectively to impart energy to the ground." Normally, the axis of movement would be less than 20 degrees to vertical, or in another embodiment less than 10 degrees to vertical.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

In the present invention, a new system was first developed to delivery acoustic energy to the ground and into the earth. However, as part of the development of such a new delivery system, other uses of the systems have been created, including a procedure to measure near surface ground viscosity and stiffness. So, first, the new acoustic energy delivery system should be described and then the pertinent process for measurement with be described.

Figure 1:
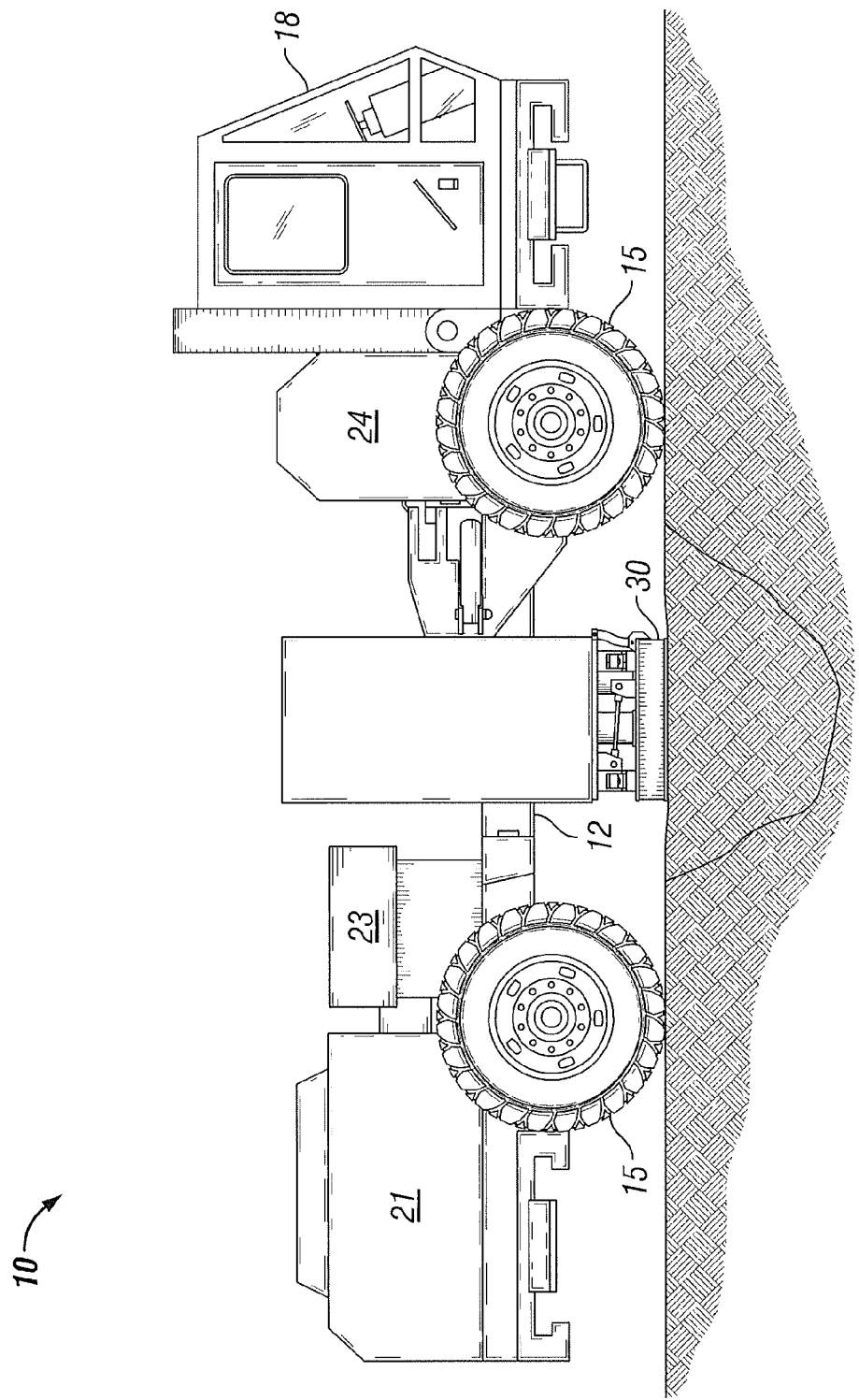
FIG. 1 is an elevation view of a discrete electric seismic source unit.

As shown in FIG. 1, an alternative vibrator actuator source 10 is shown comprising a chassis 12, four wheels 15 and a driver's cab 18. The alternative vibrator actuator source 10 uses a diesel engine 21 to drive a hydraulic pump system 23 and to also turn an electric generator 24. The hydraulic pump system 23 may be used to drive the source 10 from location to location and to operate other equipment on the source 10 or a conventional vehicle drive train may be used to drive the wheels 15. For the source 10, the electric generator 24 provides the electric power to deliver the acoustic energy into the ground. In an alternative approach hydraulic pump 23 would be eliminated and the vibrator would be fully operated by electric power and an electric drive mechanism.

Figure 2:
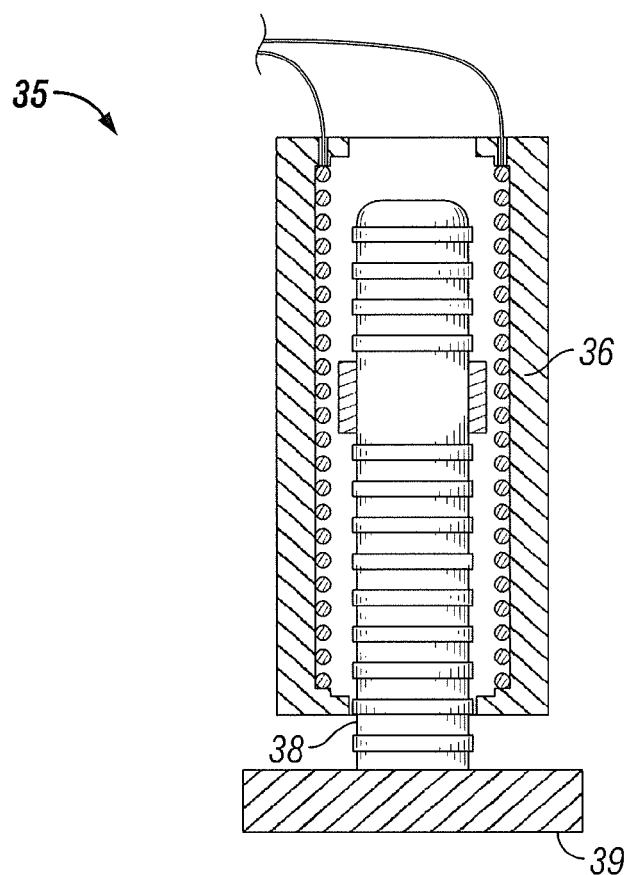
FIG. 2 is an enlarged fragmentary view of an electromechanical linear motor assembly for delivering seismic energy into the ground.
Figure 3:
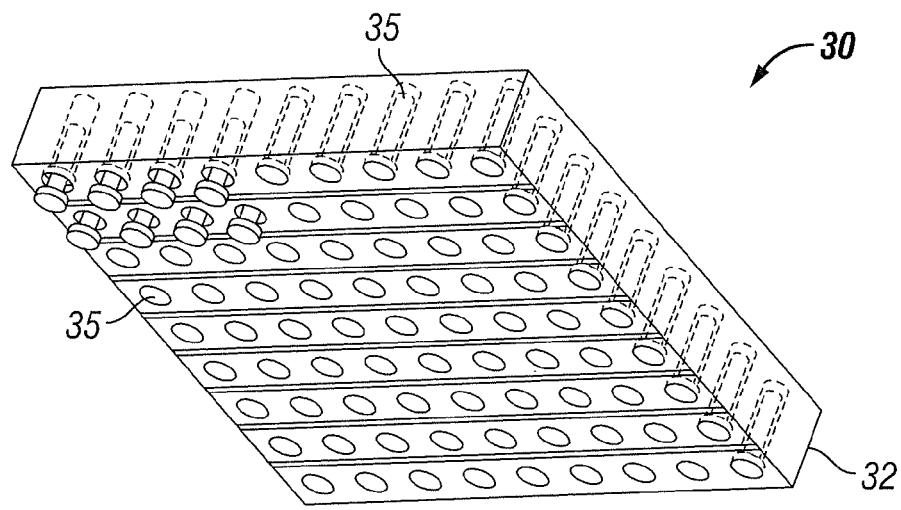
FIG. 3 is an enlarged perspective fragmentary view of a grid of electro mechanical linear motor assemblies for cooperatively delivering seismic energy into the ground.

Referring more specifically to FIGS. 2 and 3, the acoustic energy delivery system 30 is carried under the chassis 12 and comprises a frame 32 that carries a number of linear motors 35. Each linear motor 35 includes a form of a tubular body 36 and a rod or actuation bar 38 that extends telescopically from the tubular body 36. A replaceable foot 39 is attached to the bottom end of the rod 38 for contacting the ground. The frame 32 includes mounts for a grid of linear motors 35. In the preferred embodiment approximately 2000 linear motors 35 are arranged in a grid of perhaps 40 by 50.

In operation, the frame 32 is lowered into proximity to the ground G and the linear motors 35 are operated to lower the replaceable feet 39 into contact with the ground G. Once all of the replaceable feet 39 are in contact with the ground G, the linear motors 35 are activated to thrust the rods 38 toward the ground G and deflect the ground g and thereby deliver an impulse into the earth. The linear motors 35 are quickly operated to recoil the rods 38 without disengaging contact with the ground G by the replaceable feet 39. By successive thrusts and recoils, a sweep of acoustic energy is effectively delivered into the earth while the feet remain in contact with the ground G.. It should be noted that the undulations and irregularities of the ground G may be accommodated avoiding decoupling across the dimension of the frame 32. This method may be arranged to automatically compensate for surface topographic variations along with soft and hard spots on the ground surface like rocks or logs. While it is recognized that ground typically does not deflect much, it does not take much deflection with a 60,000 pound vibrator holding the replaceable feet 39 to the ground G to deliver very useful acoustic energy. In this procedure, all of the linear motors 35 would be operated at the same time using electrical power created by the electric generator 22. The impulses would be repeated in a sequence where the impulse would occur with progressively increasing or decreasing rapidity such that a progression of frequencies of impulse forces would effectively deliver acoustic energy into the earth. The acoustic energy being characterizeable as a progressive sweep of frequencies covering a spectrum from about 1 Hz up to at least 80 Hz and preferably up to at least 120 Hz.

The electric linear motors 35, working in conjunction, would not suffer the limitations of the hydraulic pumping systems at high frequency. Applying and reversing electric power instantly to the linear motors 35 causes movement on the rods 38, and with such instant response, the impulse frequency range is greatly expanded. By using electrical control circuits that are commonly available for diesel electric train locomotives and hybrid cars, the power can be applied instantly with a very high degree of control and stabilization.

It should be recognized that higher frequencies than typically delivered may be achievable by the source 10. Perhaps frequencies as high as 200 Hz or higher may become useful in the field of seismic prospecting. There is no recognized reason that source 10 cannot deliver such high frequency acoustic energy into the ground G. And it is generally understood that high frequency energy provides high resolution data. Unfortunately, high frequency energy attenuates in the earth more rapidly than low frequency energy. With a large number of linear electric motors, whether 200, more than 2000 or less than 200, will be able to deliver high energy at high frequency. The size of the linear motors may be reduced or increased to adjust and adapt to ideal energy delivery system to create an optimal frequency range with high energy across the spectrum.

The selection of the specific linear motors is an engineering issue at production time because they can be sourced that have a large thrust force but with short strokes as compared to those that have longer strokes with less thrust, but higher speeds. In one envisioned embodiment, the frame 32 has approximately 112 linear motors 35 arranged in a grid of perhaps 8 by 14. Each linear motor is capable of outputting a peak acceleration force of approximately 2400 Newtons (N) or approximately 540 pounds-force while using 34 amp RMS (Arms) at 240 volts AC. The 112 linear motors would then be capable of outputting 268,800 N or 60,480 pounds-force using approximately 914 kilowatts of power. An additional advantage to the linear motor is that they come in varying sizes and force output that that can be tuned to achieve a desired acceleration and sustained velocity of motion. Also the electronic control for the linear motor is will understood because of the wide use in manufacturing applications.

The acoustic delivery system 30 utilizes a significant number of discrete linear electric motors to deliver acoustic energy, but the linear electric motors 35 inherently provide electrical feedback depending on the physical reaction of the rod 38. In other words, when a specific electric current is directed to a linear electric motor 36, the rod 38 should (without a load) move in a telescopic manner with respect to the tubular body at a known rate to a known position. The linear motors have a feedback system that actually reports to the controller the location of the rod 38 relative to the body so a feedback circuit is created. Physical resistance of the rod to movement and failure to move to the anticipated position alters the field within the tubular body 36. This altered electromagnetic field may be measured to provide instant feedback as to the resistance that the rod 38 is undergoing as part of the feedback circuit. The variation in the electrical power demands necessary to achieve the desired impulse of energy into the ground is essentially a measurement of the viscosity and stiffness of the near surface at a measurement point of the foot 39. Thus, comparing the amperage and voltage required to achieve the desired impulse and move each rod 38 into the ground provides an instantaneous measurement is taken of the earth's physical parameters at the point of each foot 39 for all of the linear electric motors 35.

These measurements of amperage and voltage requirements can then be related to the earths stiffness, compliance and viscosity. These measurements would be similar to a civil engineer's measurement of soil density, and compaction. The exact relationship between the measurements of the seismic source and the civil engineers measurements depends on the calibration of the seismic source and is not something that can be easily calculated. Aspects that would impact the relationships would be simple things for example like the size and shape of foot 39. The calibration program envisioned would be very similar to how a foundation is built. First the raw soil is measured by standard civil engineering tools like a nuclear density meter and proctor test and then the seismic source would operate on the same spot of land. The two measurements would then be compared and related to each other. Over the course of sampling and comparing many different soil ground conditions a calibration curve would be created and could then be applied to the measurements. From these calibrations, viscosity, stiffness, density, near surface shear and compressional velocities could all be measured and calibrated.

In another practice or embodiment of the invention, either prior to or after the acoustic energy is delivered to the ground and into the earth, the rods 38 may be set to apply a set force to the ground for a period of time. While the force is being applied, movement of the rods provides a measure of penetration and overall deformation of the ground. This information may be used to back calculate the viscosity and stiffness of the ground under each individual linear motor 35 by direct measurement.

Another embodiment of the invention would be to apply a constant force on all but one or a few linear motors. For example, the linear motor at the center of the frame may be operated to provide a pulse while the others apply a constant force. The feedback from the linear motors applying a constant force provides shear velocity, compression velocity and perhaps identify the type of shear waves that are prominent in the near surface.

With this type of system, the viscosity, stiffness, penetration, deformation, shear velocity and compression velocity may be measured at every source point for a seismic survey. This would lead to accurate understanding of the near surface statics and velocity control and enable additional modeling not yet created. This data would be highly beneficial for processing and near surface static corrections.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. Ground Viscosity and Stiffness Measurement for Near Surface Seimsic Velocity, Robert Ley, et al. Geophyscial Prospecting, 2006, 54, 751-762

The invention claimed is:

1. A process for measuring near surface properties of the ground for use in seismic prospecting, the process comprising:
    a) providing a grid of linear motors arranged in a frame and oriented generally vertically such that each linear electric motor includes a rod that in operation extends down to contact the ground with a lower end of the rod;
    b) extending the rods with a constant force against the ground for a period of time and measuring electrical feedback at one of more linear electric motor to create a feedback circuit;
    c) measuring the rate of penetration for each rod into the ground;
    d) measuring the overall deformation of the ground made by each rod; and
    e) computing a viscosity and stiffness of the ground based on the rate of penetration and overall deformation measured.

2. The process for measuring near surface properties of the ground according to claim 1 further including the step of pulsing a single linear electric motor while maintaining a constant force on the remaining linear electric motors to measure the shear velocity and compression velocity through the ground.

3. The process for measuring near surface properties of the ground according to claim 2 wherein the measurements of rate of penetration and overall deformation are taken at substantially all of the source points within a survey area.

4. The process for measuring near surface properties of the ground according to claim 1 wherein the measurements of rate of penetration and overall deformation are taken at substantially all of the source points within a survey area.

5. The vibratory seismic source according to claim 1, wherein the linear motors are arranged in a grid between 10 and 5,000, such as between 100and 2,000, for example between 200 and 1,000.

6. A process for measuring near surface properties of the ground for use in seismic prospecting and delivering seismic energy into the ground, the process comprising:
    a) providing a grid of linear motors oriented generally vertically such that each linear electric motor includes a rod that in operation extends down to contact the ground with a lower end of the rod;
    b) extending the rods with a constant force against the ground for a period of time and measuring electrical feedback at one of more linear electric motor to create a feedback circuit;
    c) measuring the rate of penetration for each rod into the ground;
    d) measuring the overall deformation of the ground made by each rod;
    e) pulsing the rods to deliver acoustic energy to the ground and into the earth whereupon the seismic energy is sensed and recorded by a system for gathering seismic date; and
    e) computing a viscosity and stiffness of the ground based on the rate of penetration and overall deformation measured.

7. The process for measuring near surface properties of the ground according to claim 6 further including the step of pulsing a single linear electric motor while maintaining a constant force on the remaining linear electric motors to measure the shear velocity and compression velocity through the ground.

8. The process for measuring near surface properties of the ground according to claim 6 wherein the measurements of rate of penetration and overall deformation are taken at substantially all of the source points within a survey area.

9. The process for measuring near surface properties of the ground according to claim 6 wherein the measurements of rate of penetration and overall deformation are taken at substantially all of the source points within a survey area.

10. The process for measuring near surface properties of the ground according to claim 6 wherein the linear motors are arranged in a grid between 10and 5,000, such as between 100 and 2,000, for example between 200 and 1,000.

11. A process for measuring near surface properties of the ground for use in seismic prospecting and delivering seismic energy into the ground, the process comprising:
    a) providing a grid of linear motors oriented generally vertically such that each linear electric motor includes a rod that in operation extends down to contact the ground with a lower end of the rod;
    b) extending the rods with a variable force against the ground for a period of time or a sweep of some fashion and measuring electrical feedback at one of more linear electric motor to create a feedback circuit;
    c) measuring the rate of penetration for each rod into the ground;
    d) measuring the overall deformation of the ground made by each rod;

e) pulsing the rods to deliver acoustic energy to the ground and into the earth whereupon the seismic energy is sensed and recorded by a system for gathering seismic date; and e) computing a viscosity and stiffness of the ground based on the rate of penetration and overall deformation measured.

12. The process for measuring near surface properties of the ground according to claim 11 further including the step of pulsing a single linear electric motor while maintaining a constant force on the remaining linear electric motors to measure the shear velocity and compression velocity through the ground.

13. The process for measuring near surface properties of the ground according to claim 11 wherein the measurements of rate of penetration and overall deformation are taken at substantially all of the source points within a survey area.

14. The process for measuring near surface properties of the ground according to claim 11 wherein the measurements of rate of penetration and overall deformation are taken at substantially all of the source points within a survey area.

15. The process for delivering acoustic energy into the earth according to claim 11 wherein a plurality of rods includes between 10 and 5,000, such as between 100 and 2,000, for example between 200 and 1,000.

* * * * *